(12) United States Patent
Story

(10) Patent No.: US 8,819,254 B2
(45) Date of Patent: Aug. 26, 2014

(54) METHOD AND APPARATUS FOR TARGETED CONTENT DELIVERY

(75) Inventor: Guy Story, New York, NY (US)

(73) Assignee: Audible, Newark, NJ (US)

( * ) Notice: Subject to any disclaimer, the term of this patent is extended or adjusted under 35 U.S.C. 154(b) by 848 days.

(21) Appl. No.: 11/904,717

(22) Filed: Sep. 28, 2007

(65) Prior Publication Data

US 2008/0109529 A1 May 8, 2008

Related U.S. Application Data

(60) Provisional application No. 60/856,975, filed on Nov. 6, 2006.

(51) Int. Cl.
  *G06F 15/16* (2006.01)
(52) U.S. Cl.
  USPC .......................................... 709/229; 709/228
(58) Field of Classification Search
  USPC ......................................... 709/227, 228, 229
  See application file for complete search history.

(56) References Cited

U.S. PATENT DOCUMENTS

| | | |
|---|---|---|
| 5,790,423 A | 8/1998 | Lau |
| 5,872,712 A | 2/1999 | Brenneman |
| 5,926,624 A | 7/1999 | Katz |
| 6,158,005 A | 12/2000 | Bharathan |
| 6,170,060 B1 | 1/2001 | Mott |
| 6,253,237 B1 | 6/2001 | Story |
| 6,480,961 B2 | 11/2002 | Rajasekharan |
| 6,560,651 B2 | 5/2003 | Katz |
| 7,451,177 B1 * | 11/2008 | Johnson et al. ............... 709/203 |
| 2006/0190616 A1 * | 8/2006 | Mayerhofer et al. ......... 709/231 |
| 2007/0077921 A1 * | 4/2007 | Hayashi et al. ............ 455/414.1 |
| 2007/0088832 A1 * | 4/2007 | Tsang et al. .................. 709/227 |
| 2007/0198716 A1 * | 8/2007 | Knowles et al. .............. 709/225 |
| 2007/0217436 A1 * | 9/2007 | Markley et al. ............... 370/401 |
| 2008/0189099 A1 * | 8/2008 | Friedman et al. ................ 704/8 |
| 2008/0235351 A1 * | 9/2008 | Banga et al. .................. 709/218 |

FOREIGN PATENT DOCUMENTS

| | | | |
|---|---|---|---|
| WO | WO 2006/076516 | * | 7/2006 |
| WO | WO 2006/084278 A2 | | 8/2006 |
| WO | WO 2006/115785 A2 | | 11/2006 |

* cited by examiner

*Primary Examiner* — Harunur Rashid
(74) *Attorney, Agent, or Firm* — Knobbe, Martens, Olson & Bear, LLP

(57) ABSTRACT

A method and protocol for creating and configuring customized paths, such as channels, for the delivery of electronic content to a variety of devices associated with a user is provided. A content provider may create a channel for each device registered by a user by creating a provisioning Uniform Resource Locator ("URL") for each device. The user may select certain content to be delivered to a registered device via the channel. The user's device requests a list of feed URLs available to the user by accessing the provisioning URL. A content management program returns the list of feed URLs to the device and the list of feed URLs stored on the device is updated. The electronic content may be distributed through the disclosed protocol directly to the registered device if the device is active, or to a computing device for distribution to passive devices.

20 Claims, 13 Drawing Sheets

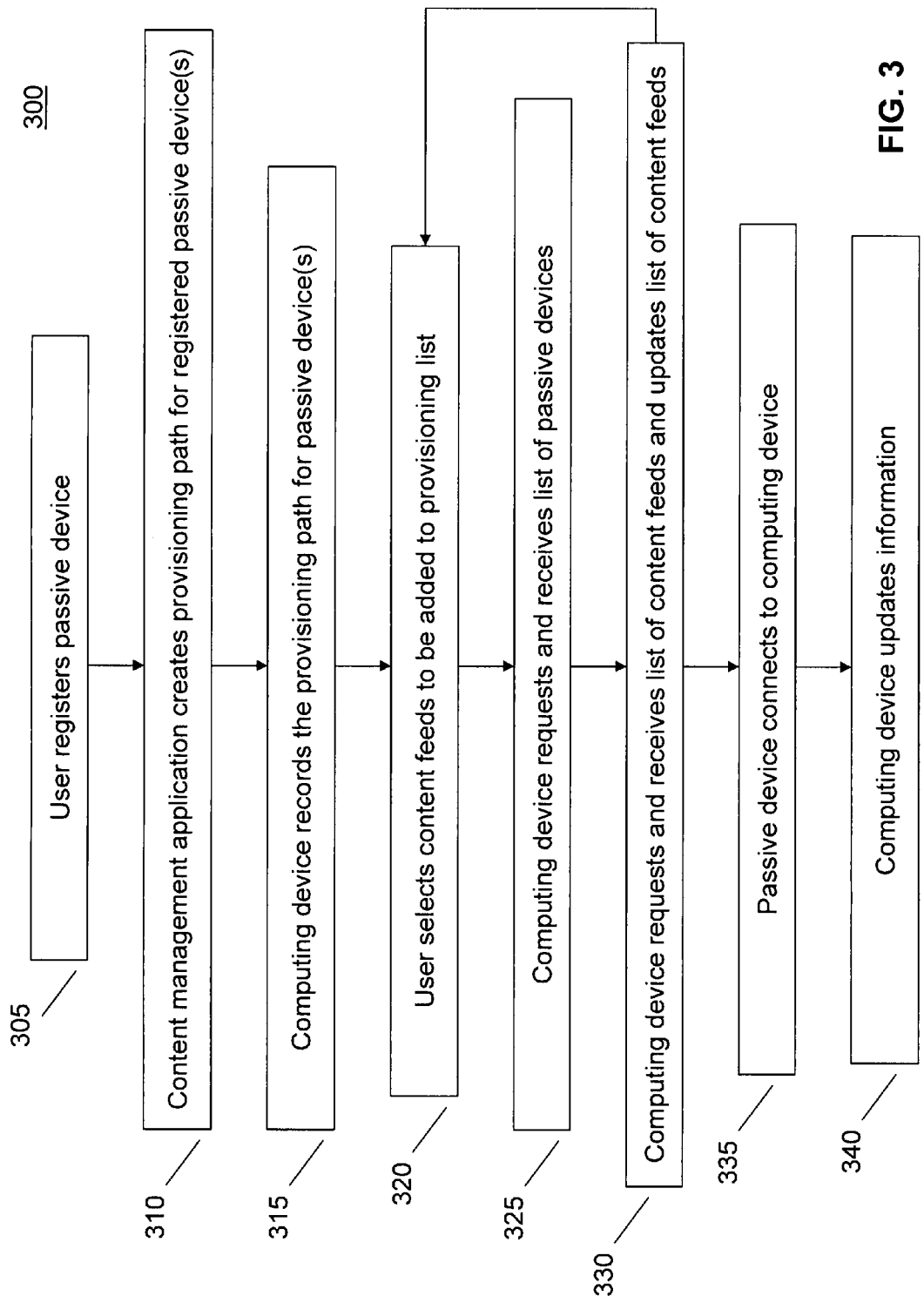

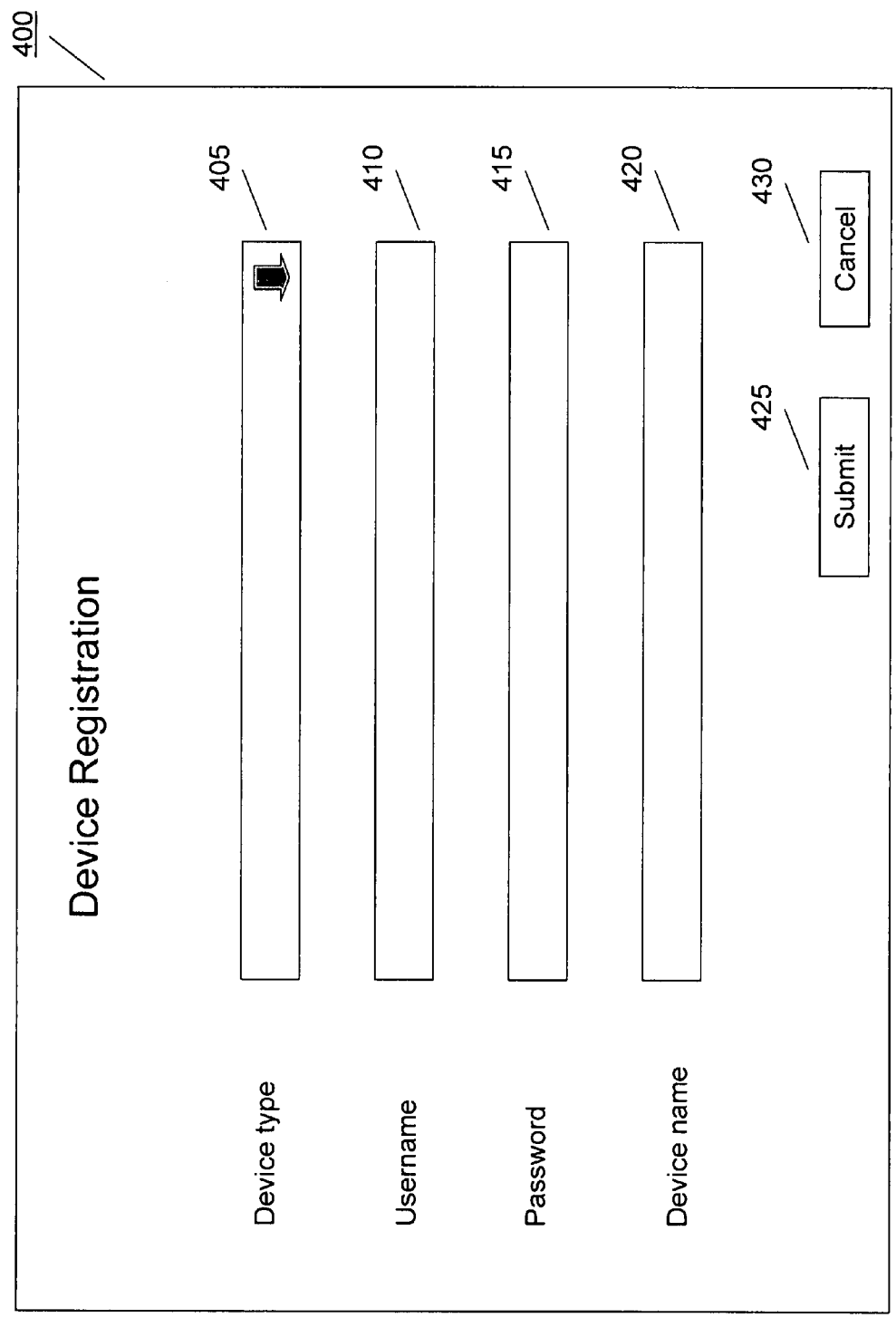

METHOD AND APPARATUS FOR TARGETED CONTENT DELIVERY

PRIORITY CLAIM

This application claims priority to U.S. Provisional Application Ser. No. 60/856,975, filed Nov. 6, 2006, entitled "Targeted Content Delivery Protocol."

FIELD OF INVENTION

The present invention generally relates to the delivery of electronic content, more specifically, to the targeted delivery of electronic content over a network.

BACKGROUND

The proliferation and considerable growth of the Internet and World Wide Web have opened new avenues of content delivery to consumers. Information delivery applications, such as web browsers, have advanced through the years with increasing capabilities and opportunities to transmit and share electronic data. First generation web browsers displayed simple hypertext linked to another file containing additional text. Over time, these browsers have been replaced by more sophisticated, dynamic applications that enable content providers and users alike to interact with each other over a network through the implementation of text, graphics, audio, video and many combinations thereof.

One of the greatest advancements of the Internet and computer networks has revolved around development of encoded audio and video files, such as MP3s. Audio and video content may now be digitally encoded into files and transmitted across one or more networks. Such digital encoding and compression techniques allow a great amount of content to be packaged into a single file, thereby making content more portable.

Spoken-word content has become an increasingly popular means of entertainment. Users may browse and purchase audio-based content over the Internet to download to a portable device. For example, an audiobook or other spoken word audio content may be purchased through an online website and downloaded to a computer or portable media device. A user may then listen to the content, subject to any restrictions imposed by the content provider, such as time, re-playing or other restrictions.

Portable media devices such as MP3 players and APPLE'S IPOD® have permeated modern society for use, not only for entertainment purposes, but also for many business applications. These devices are no longer limited to simply playing a user's encoded music files, but instead have become an invaluable means by which regularly updated information, such as electronic news feeds or other updatable content, are provided to and consumed by an end user.

One emerging technology which provides access to electronic content is the distribution of multimedia files through syndication feeds using the Really Simple Syndication ("RSS") standard. Content providers may publish a web feed on a hosting site or application. A user wishing to "subscribe" to the content can register or activate a reader, such as a special-purpose application or browser, which will present the user with updated or new content.

Content providers periodically update the information or materials posted on a server or site, and the content provider will update what is presented to the user via links to the information. Examples of web sites or readers include personalized web pages from GOOGLE® or YAHOO! INC.'S MY YAHOO!®. When a user subscribes to a particular feed, the reader will poll the server on which the content is stored, looking for updates. If an update is located, the reader will post, or update, the page presented to the user.

The field of syndication feeds with downloadable content, sometimes referred to as "podcasts," has become a popular method of sharing and transmitting updated media to a variety of users through RSS feeds. A creator of a podcast, which is generally a downloadable audio or video file, such as an MP3 or MP4 file, simply records and encodes his or her content and posts the podcast to a server or other site which may post the podcast for its users to download. A content provider provides a syndication feed which users can subscribe to using client applications, such as APPLE'S ITUNES®. A user may download and then transfer those podcasts to a portable media device in order to listen to or watch the podcast at a later time, away from the computer.

Traditional podcasting involves a user's subscribing to a feed by registering the Uniform Resource Locator ("URL") of the feed with a client application, or podcatcher software. The user's personal computer connects over a network to retrieve the URL feed from the content provider's server through the podcatcher software. The server then returns an RSS-compliant extensible markup language ("XML") package to the computing device. The computing device extracts an enclosure URL, which has the location of the content, from the XML package. The computing device then retrieves the content file located at the enclosure URL. The computing device then imports, or stores, the content file either on its own storage media, or at another designated location such as a portable media device or player. Typically the podcatcher software periodically polls the server to download updated RSS feeds, whereby the process is then repeated at some interval.

The content provider may require users to register each device in order to facilitate delivery of content. The device, usually through a PC, is registered through a connection to the content provider's servers in which some identifying aspect of the device is stored by the content provider. These identifiers may include hardware serial numbers, device names, device types, etc. Requiring the registration of a device may allow the content provider to maintain control over the content it distributes, such as by preventing unauthorized playback if a device is not registered.

Current methods for subscribing to a podcast, however, are inefficient. A user must register the URL of each feed separately at each destination device or system. For instance, if a user desires to have a particular feed sent to his or her portable media player, home computer and work computer, then the process of registering the feed with must be repeated for each device. When a user desires to unsubscribe from a particular feed, the process of unsubscribing from the feed must be repeated with each device. This is inconvenient and inefficient for the user.

SUMMARY

In accordance with certain embodiments of the present invention, a method and apparatus for creating and configuring data transmission paths, such as channels, for the delivery of electronic content to a variety of devices associated with a user, are provided.

A method and protocol for creating and configuring customized paths, such as channels, for the delivery of electronic content to a variety of devices associated with a user is provided. A content provider or other party may create a channel for each device registered by a user by creating a provisioning Uniform Resource Locator ("URL") for each device. The user may select certain content to be delivered to a registered device via the channel. The user's device requests a list of feed URLs available to the user by accessing the provisioning URL. A content management program returns the list of selected feed URLs to the device and the list of feed URLs stored on the device is updated. The electronic content may be distributed through the disclosed protocol directly to the registered device if the device is active, or to a computing device for distribution to passive devices. A user, content provider or other entity may manage the delivery of the feeds contained in the channels using a web-based control panel or other application.

In an alternative embodiment, methods for interacting with passive devices are provided. Passive devices may be considered devices that cannot request content and act primarily as content recipients. In this alternative embodiment, a personal computing device, such as a PC, may act as a proxy, enabling content described by the list of feeds to be delivered to the passive device. The computing device may retrieve a provisioning URL for each registered passive device. Upon synchronizing the passive device, the computing device may deliver the content described in each feed URL contained in the provisioning URL to the passive device.

In some embodiments, the user, a content provider or other party may manage the feeds contained in the channels using a web-based control panel or other application.

Certain embodiments of the invention include a method of delivering electronic content from a remote computer to a plurality of playback devices, which includes receiving at least one registration request for the plurality of playback devices; providing a content management program that allows a user to register the plurality of playback devices and specify at least one content feed to be associated with each of the plurality of playback devices, wherein the content management program communicates a provisioning network location to each of the plurality of playback devices that includes a provisioning list specifying the at least one content feed associated with each of the plurality of playback devices; and causing the plurality of playback devices to periodically communicate with the provisioning network location and copy the at least one content feed associated with each of the plurality of playback devices.

BRIEF DESCRIPTION OF THE DRAWINGS

The invention is illustrated in the figures of the accompanying drawings, which are meant to be exemplary and not limiting, in which like references are intended to refer to like or corresponding parts, and in which:

FIG. 3 is a flow chart depicting certain steps involved in content delivery in accordance with an embodiment of the present invention;

FIG. 4a is an illustrative interface for device registration interface accordance with an embodiment of the present invention;

FIG. 4b is a more detailed depiction of the interface in FIG. 4a;

DETAILED DESCRIPTION

Detailed embodiments of the present invention are disclosed herein, however, it will be understood that the disclosed embodiments are merely exemplary of the invention, which may be embodied in various forms. Accordingly, it will be understood that specific functional details disclosed herein are not to be interpreted as limiting, but merely as a representative basis for teaching one skilled in the art to variously employ aspects of the present invention.

Figure 1:
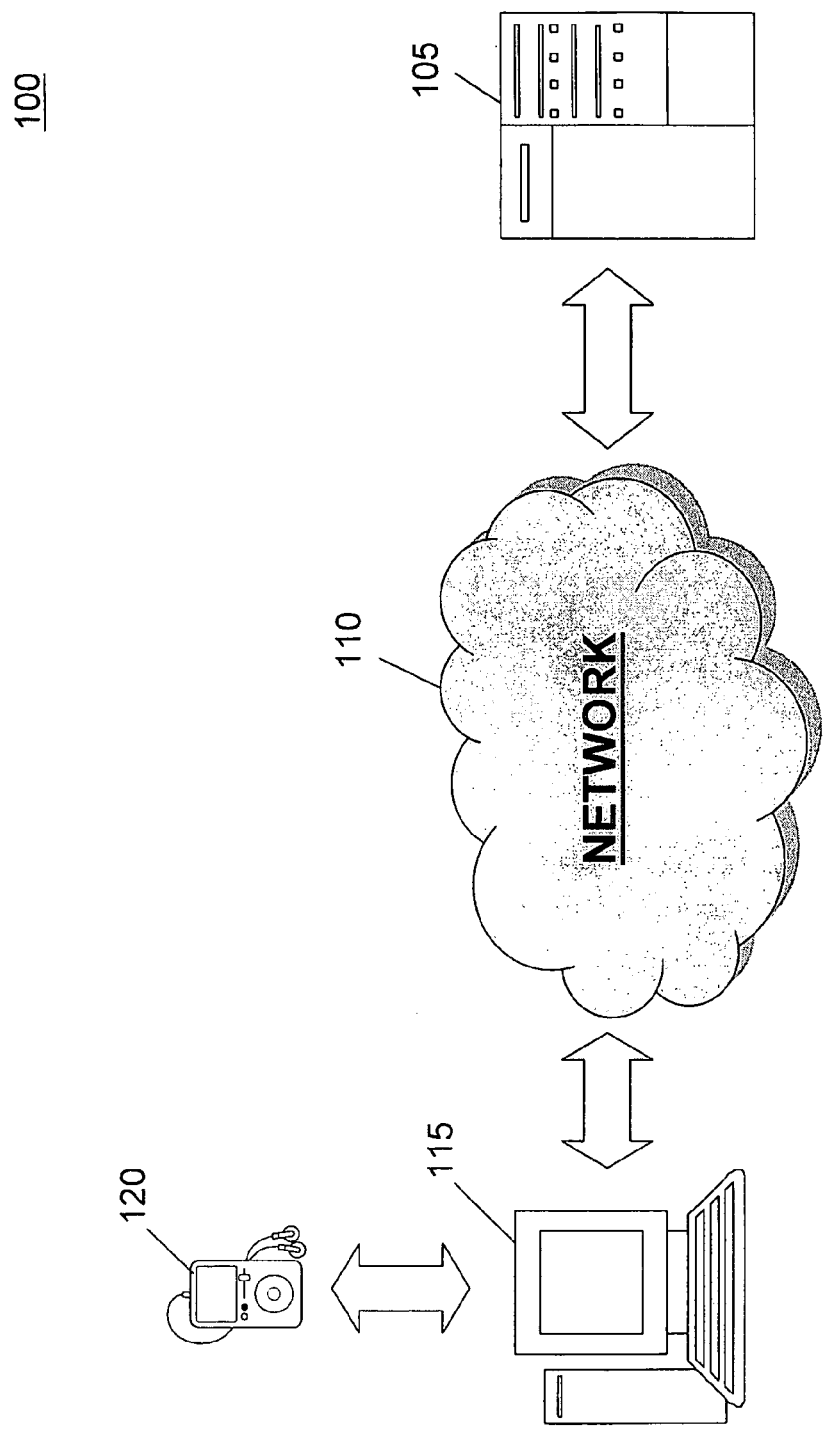
FIG. 1 is a diagram of a computer network in accordance with an embodiment of the present invention.

An embodiment of a computer network constructed in accordance with the principles of the present invention is depicted in FIG. 1. In this illustrative embodiment, a computing device 115 (such as a personal computer or other suitable computing device) communicates across network 110 with a server 105. This may be accomplished using known communication protocols such Hyper Text Transfer Protocol (HTTP), Ethernet, streaming technologies, etc. Network 100 may be any suitable local area network (LAN), wide area network (WAN), the Internet or any suitable combination thereof. As shown, a portable media device 120 such as a PDA, cell phone, MP3 player or the like may be linked electronically to computing device 115 (e.g., through a hardwired connection such as a USB or Firewire link or wirelessly through a WiFi or cellular link). Such devices, which require a host such as computing device 115 to access information, are referred to as "passive devices." Alternatively, in some embodiments, portable media device 120 is capable of communicating substantially directly with server 105, via either a wired or wireless network connection. A device 120 having such a capability may be referred to as an "active device." Any device capable of receiving and playing content, such as portable device 120 and/or computing device 115 may be referred to herein as a playback device.

In operation, computing device 115 may include one or more content management applications provided by a content service or third party software vendor that manages and/or coordinates the downloading, transmitting, and storage of electronic content. In certain embodiments, in which portable media device 120 connects directly to one or more servers 105, the content management application may reside on the device itself. In other embodiments, such management application may reside on server 105 and/or be distributed as required to a portable device 120 (e.g., in a distributed application environment). Such management application may be accessed via an Internet browser.

A user may manage subscriptions to a variety of content sites through the content management application. For example, a user may browse content available on a computer network in search of specific content in which the user is interested. This may involve searching the Internet and other electronic networks and/or databases. Once the user identifies certain desirable content, he or she may populate a provisioning list associated with the content management application with network locations containing that content (e.g., with pre-existing bookmarks or manually). This provisioning list may be defined using the content management application and may further be used in selecting and managing content transmitted to the user as described herein.

For example, once the provisioning list is defined, computing device 115 and/or portable device 120 may periodically refer to the provisioning list to determine what content to obtain. One way this may be accomplished is by providing a provisioning list stored locally on each device which is used as a script or other schedule of content to be downloaded. The device may periodically consult the provisioning list and download the content from the network locations specified thereon. Thus, the provisioning list may be device specific. The user may create such a provisioning list with the content management application on computing device 115 and transmit it to other devices such as portable device 120. Alternatively, the provisioning list may be created independently on each device, or created on portable device 120 and then transmitted to computing device 115, etc.

A user may customize the provisioning list for each device to specify which content is to be delivered to which device. For example, a user may create a provisioning list on computing device 115 specifying certain network locations from which to obtain content. Such locations may be referred to herein as "content feeds." The user may copy this provisioning list and edit it to reflect which content is to be sent to device 120. The list may then be sent to device 120. For example, the provisioning list generated at computing device 115 may include a news feed, a sports feed and a financial services feed. This provisioning list may be copied and the user may edit the list to include only the news feed and to add a politics feed. After editing, the new provisioning list may be transmitted to portable device 120 through email or other means (the provisioning list may also be transmitted to device 120 and then edited, if desired). This approach allows the user the flexibility to decide which content feeds are to be received at device 115, at device 120 and at both.

Another way this may be accomplished is by configuring each device to periodically refer to a master or global provisioning list stored on a remote computer, such as server 105, which may be used to specify the content for some or all of a user's playback devices. For example, such a master provisioning list may specify the feeds for each device included in the list. Thus, for example, a user may register each of his her devices with the content management application, define which content feeds he or she is interested in and specify which device should receive which feed. Once this information is specified, each registered device may receive an email or other communication which includes a link to a network location that includes the master provisioning list. Each registered device may periodically visit the specified location and determine which content feeds it should receive based on entries in the provisioning list for that device. Thus, for example, when the device consults the provisioning list, if the entries on the list are different from those currently specified on the device, the device updates its feeds to match those specified in the provisioning list.

This approach allows a user to specify, manage, and control the content feeds for each device using a single content management application (e.g., centralized control). Moreover, because the content management application may be located on a network computer, the user may access the application from virtually any device having network access and modify or update the feeds received by any of the user's registered devices, allowing the user great flexibility in managing content feeds.

In other embodiments, the master provisioning list may be divided into discrete provisioning lists. In such embodiments, a device may receive the discrete provisioning list intended for that device which specifies content feeds for that device only. In such embodiments, the discrete provisioning list may be sent to the device which is periodically referred to as further described herein. Such embodiments reduce the number of feed locations sent to a registered device to only those which are needed for that device. Other embodiments, where substantially the entire master provisioning list is sent to each device, allow the user the option to modify the local provisioning list without requiring network communication with the control panel (i.e., directly from the local device). This provides the user with additional flexibility in specifying content feeds. In such embodiments, the control panel may update its provisioning list based on any such changes.

Once the content feeds are defined in each device from the provisioning list, each playback device may periodically connect to the feeds specified in the provisioning list and download the desired content in the form of an electronic file. In some embodiments, each device may be configured to periodically poll the specified content feeds through network 110 looking for updated or new content to which the user has subscribed to or requested. In other embodiments, such as where the content provider is also the entity providing the channel, updated or new content may be transmitted to devices 115 and/or 120 substantially automatically as it becomes available or at predefined intervals (which may be user selected). For example, such content (or links to updated content) may be sent to the user using a "push" technology over a wireless network subject to memory limitations in devices 115 and 120.

When new or updated content is available, the user may view or listen to the content with computing device 115 (e.g., through a WINDOWS MEDIA PLAYER®) and/or may transfer the content to portable device 120, such as APPLE INC.'S IPOD® or to any suitable other digital media player (generally depicted as device 120 in FIG. 1). The user may then view or listen to the electronic content at his or her convenience. For example, if a user has subscribed to a spoken-word news feed which updates daily, such as a RSS feed, the morning's current news and headlines content file may be downloaded to computing device 115. If the user wishes to listen to the news content while commuting to work or exercising, the user simply synchronizes player 120 with computing device 115 (through a wired or wireless communication path), thereby transferring or copying the content file from computing device 115 to the portable media player 120. Afterwards (e.g., the next day), the user may repeat the process and obtain a new and updated news feed published by the content provider. Alternatively, such content may be transmitted substantially directly to device 120 as it becomes available as described above in connection with the provisioning list (assuming device 120 is an active device).

Figure 2:
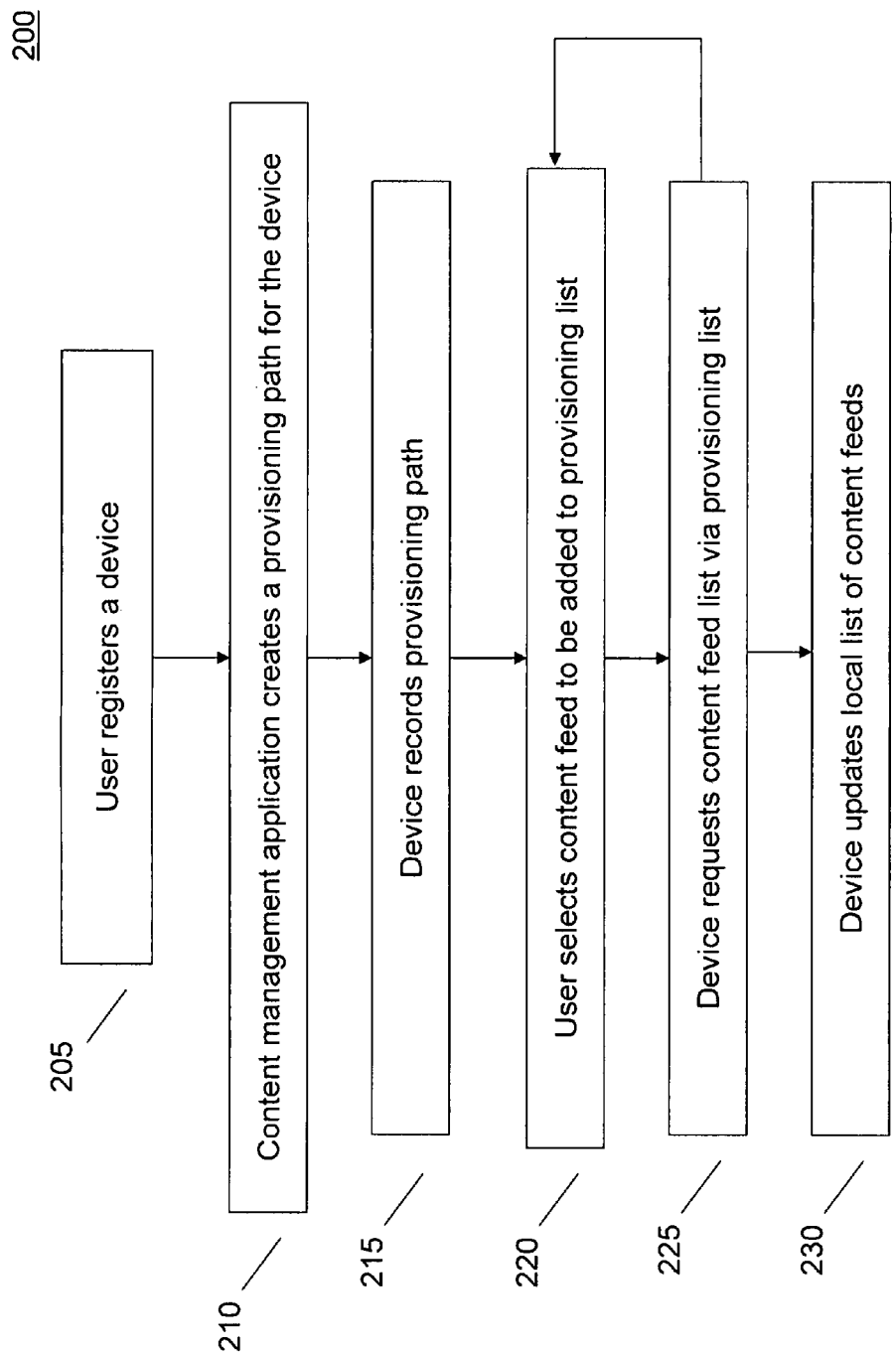
FIG. 2 is a flow chart depicting certain steps involved in content delivery in accordance with an embodiment of the present invention.

FIG. 2 depicts a flow chart 200 illustrating some of the steps involved in obtaining desired content in accordance with an embodiment of the present invention. As shown, at step 205, a user may register one or more of his or devices (such as portable media device 120 and computing device 115) with a content management application supplied by a provider or content management service (which may reside on server or other remote computer 105). The registration process is described in more detail below in connection with FIGS. 4a and 4b. Registering a device with the content management application creates a "channel" from server 105 to the user's device. Generally speaking, this channel is a path or network location that contains the master provisioning list that user's registered devices will refer to for content feeds. For example, this path, which may be referred to as a provisioning path, may be a URL (a provisioning URL) or other network address. Thus, in response to device registration, the content management application may create one or more provisioning paths, for the registered playback device(s) at step 210. These paths are sent to the registered playback device(s) and are recorded or otherwise retained by the device (s) (step 215).

Once a provisioning path or channel has been specified by the registration of a device, that channel may remain "empty" (i.e., without any specific content feed(s) associated with that path) until the user, content provider, or other party assigns one or more content feeds to the provisioning list associated with that channel. In some embodiments, at step 210, a user may associate one or more content feeds with the provisioning path such that a "populated channel" (i.e., a channel that is not empty) is sent to the registered device. Such populated channels may include certain default content feeds, etc. Once one or more content feed(s) are assigned to the associated provisioning list, the channel may deliver any content specified by those feeds. When a channel is empty, no content is provided by that channel.

Moreover, in some embodiments, it may be necessary to activate a channel or particular provisioning list associated with a channel to receive the content specified therein. For example, a playback device may have one or more associated channels each of which may have one or more provisioning lists. The user may activate (either remotely or locally) the desired channel(s) for each device and the desired provisioning lists associated with those channels receive the specified content. In other embodiments, channels and/or provisioning lists may be activated substantially automatically based on certain pre-defined criteria.

For example, in the case where each registered playback device has only one channel and associated provisioning list, the channel may be automatically activated upon the assignment of one or more content feeds.

It will be understood that a provisioning URL is merely one example of an address or other delivery path used in accordance with the present invention to provide electronic content to registered playback devices and that any suitable path may be used, if desired. Moreover, an embodiment of the present invention allows a user to have multiple different devices registered at any one time with one or more content management applications. This allows the user to specify the destination (device 120, computer 115 or elsewhere) to which he or she wants content delivered (e.g., where he/she will consume a content file).

At step 220, a user may modify, identify, or assign one or more content feeds to the provisioning list associated with the channel created at step 210 (i.e., populate or further the provisioning list).

Once the provisioning list is initially populated, the channel and provisioning list may be activated and such activation may be communicated to the user's registered devices. At step 225, the registered playback devices may consult the provisioning list via the activated channel and copy the content feeds specified for each playback device (e.g., an initial seeding process). The playback devices may then receive content as specified by the feeds stored in the playback devices. In certain cases however, the initial seeding may occur after step 215 if a populated channel is initially sent to the playback device (e.g., by proceeding directly to step 225).

Next, if desired, the user may then update, change or otherwise modify the provisioning list of content feeds (by returning to step 220). When the playback devices subsequently consult the provisioning list again (step 225), that list is compared to the provisioning list stored locally in the playback devices and the local list is updated to reflect the changes made by the user (step 230).

In some embodiments, channel and provisioning list creation may be fully or partially automated. For example, initially a user's computing device, such as device 115, may be manually configured by a user to receive several content feeds from different locations (e.g., through the content management application mentioned above). Computing device 115 may have one or more associated devices 120. As a default setting, all registered devices 120 may receive some (or all) content received by computing device 115 and may be modified by the user to reflect certain preferences.

However, in some embodiments, the user may choose to invoke an auto-configuration application supplied by a third party or content provider (not shown) that examines computing device 115, identifies content sources and/or feeds, such as content bookmarks and/or subscription-based feeds, and imports them into a content management application for use as entries in a provisioning list for devices associated with the same (or different) user as computer 115. For example, as a default setting, all of the user's registered devices may receive the same content as the source device (in the case of computer 115). The user may then customize the feeds for each registered device as explained in connection with FIG. 2.

Figure 5A:
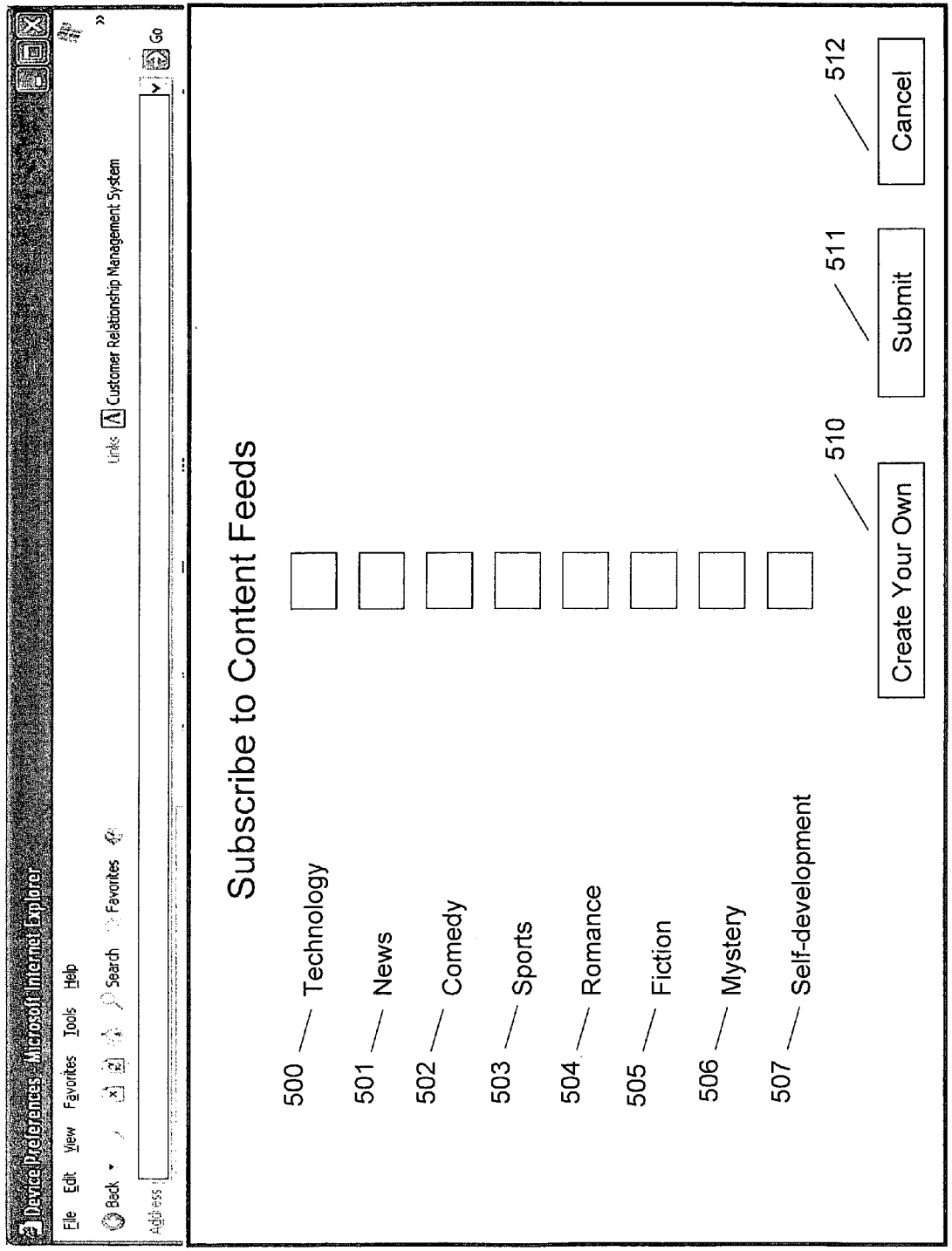
FIG. 5a is an illustrative interface for subscribing to one or more content feeds in accordance with an embodiment of the present invention.

Moreover, in some embodiments, such an auto-configuration program may arrange the feeds into certain user-friendly selectable categories (e.g., as shown in FIG. 5a) when they are imported into the content management application. Such an auto-configuration application may also allow the user to specify various characteristics associated with content sources such as polling periods, content size limitations, data or file type, etc.

This approach provides a way in which pre-existing content sources or feeds may be automatically imported into the content management program rather than require the user to manually re-enter some or all of the pre-existing information. Moreover, the content feeds may be arranged into manageable groups which are more easily controlled and customized by a user. These categories, and the organization process in general, however, may be based on, or subject to, user preference and may be modified or further changed after the automated process is complete to better reflect the user's desires. For example, the category titles themselves may be user-defined or types of content sent to categories may be user-defined. In some embodiments, if a computing device 115 is associated with a portable device 120, as part of the registration process of device 120, an auto-configuration program may be launched to optimize or otherwise streamline the user's experience (e.g., by automatically populating the provisioning list of the device 120 with the entries of device 115, etc.). Such a utility may be provided as an option by a content provider to improve the user's experience.

Furthermore, through the content management application, the user may configure the groups to periodically poll certain sources for content if it is not automatically supplied (e.g., not a feed but a source of content). For example, if a user wants to receive free sports content from the SPORTS ILLUSTRATED® website, the subscription process may allow the user to specify this website, e.g., via a URL or existing bookmark reflecting a URL, select certain content (e.g., professional football news), specify a polling period to be associated with the SPORTS ILLUSTRATED® link and have that content delivered in accordance with the polling or update period to one or more registered devices according to user preferences and specifications.

As mentioned above, registered device may be a computing device 115, such as a PC, or a portable media player 120, such as an IPOD®, a cellular phone, a PDA, an audiobook player or any other device having a portable playback capability. In some embodiments, one or more remote computing devices 105, such as a server, may be used in the implementation of the channel protocol described herein. For example, one computing device 105 may keep track of devices registered by users and provide the content management application described herein. Another computing device 105 may identify, create, and assign the provisioning channels sent to the registered device. Yet another computing device 105 may be the object of the assigned provisioning channel and include the provisioning list of contents feeds referred to by registered devices. It will be understood, however, that some or all of these functions may be performed by a single remote computing device 105 or shared among multiple remote computing devices 105, depending on network configuration.

In some embodiments, computing device 115 may have one or more associated channels, with each channel having a distinct provisioning path and associated feed list. For example, multiple channels for a particular device 120 may correspond to one channel for each user of that device. Such a device/user combination allows for better control in multi-user environments (e.g., a family or business sharing one computing device, each family member or employee as a separate user, each with its own channel).

For example, in a family environment, a parent may create a channel for each family member through the content management application. This channel may specify each family member's device(s) and deliver content as specified. This allows the parent to populate the content feeds for each channel and restrict content received by children to that deemed suitable. Thus, it allows the parent close control over content delivered to children to content feeds specified and approved by the parent on a channel by channel basis. Moreover, content may be customized for each child depending on factors such as age, gender, interests, etc., rather than having the same content delivered all children. In addition, the content provided by each channel may be customized to reflect the interests of each adult based on the same or similar considerations.

Moreover, access to the content management program may be password protected, such that children cannot access the program and alter the content feeds associated with their channel. Furthermore, in some embodiments, the content management program may be configured to send an email or other communication to the person who set up the account and established the password with the content management application, to inform that person of a change in the content feeds associated with a certain channel (such as a channel designated for a child or employee). The communication may also detail the changes made or request approval to allow the requested changes.

The user may create and manage the feeds contained in the channels through a central location, such as through a web-based control panel in the content management application (e.g., shown in FIGS. 4-5). Such a central location may include computer 105 or other remote network computer. This implementation enables the user to change the destination of the content feed depending on user preferences. Furthermore, if there is a need to target content to specific devices or users, the knowledge of the destination user and/or system can be used to accomplish such targeting.

For example, in the case of a corporate environment, each employee may be assigned a channel having specific content feeds that provide information required to perform the job with access to other information sources blocked or restricted. Such a channel and associated content feeds may be assigned based on an employee profile created to reflect the employee's job function and be enforced on any employer network the employee logs onto. This gives the network administrator control over content provided to company employees. Other scenarios include academic institutions where channels are assigned to students and populated according to their profile, which may be based on curriculum, major, registered courses, year or level of study, etc., or feeds the student specifically signs up for (e.g., to receive the necessary course materials). Such a system may be useful in a classroom setting such that the information provided reflects the course being taught, which may change throughout the day. The content provided to the classroom may be based on a student login. Moreover, it is further useful for any network the student logs onto with the institution (whether through a student device or school terminal).

In some embodiments, a channel may correspond to one or more individual devices. For example, a user may register an IPOD® as a device type, as opposed to registering each individual IPOD®. The channel created for the IPOD® device type may be used to deliver feeds and/or content to multiple IPODS®. Such IPODS® may or may not be registered with the content provider. In this way, one or more IPODS® may receive the same feeds and/or content, as they are all connected to one channel. The list of content feeds such as feed URLs provided by remote computing device 105 may be encapsulated in outline processor markup language ("OPML"). OPML is an XML format for outlining information or data.

In some embodiments, a channel may have one or more channels within it. In such an embodiment, the user may assign one or more smaller channels to a larger channel. The user may then update, change or otherwise modify the list of smaller channels assigned to a larger channel. For example, a user may have a Local News Channel, a U.S. News Channel and an International News Channel. These channels may then be assigned to a larger channel, the News Channel. The News Channel may then be assigned or removed from the user's device channel as previously described.

In certain embodiments, remote computer 105 may include a database containing a list of content feeds for each provisioning channel assigned to a user's device. Remote computer 105 may also enable the user, content provider or other party to update the list of content feeds (i.e., to allow continued customization of the content sent through the channels). The content provider may use this capability, for example, to push content to a user.

Flowchart 300, depicted in FIG. 3, illustrates some of the steps involved with an alternative embodiment of the present invention using passive devices 120. This alternate embodiment allows a computing device 115 to act as a proxy for such devices, allowing content described in the feed URLs to be delivered to the passive devices 120 through the computing devices 115.

As with the active device channel protocol described above in connection with FIG. 2, a database on server 105 may contain a list of passive devices registered by each user (registered at step 305). The content management application may create a provisioning path such as a channel for each registered passive device (such as a passive version of device 120) at step 310. The provisioning path for each passive device is stored on computing device 115 at step 315. In an alternative embodiment, computing device 115 may store the provisioning path on the passive device 120. When passive device 120 connects to computing device 115, the computing device retrieves an identifier from the passive device and requests the provisioning path for that passive device 120 from remote computer 105. Next, at step 320, the user may select the desired content feeds for the provisioning list to be associated with the provisioning channel. However, in some embodiments, content feeds may have been selected by the user at step 310, or may include certain default settings. In this case, the user may update or modify the content feeds previously specified (at step 320).

Once a user has registered a computing device 115 and one or more passive devices 120, the computing device may request and receive a list of passive devices 120 from server 105, allowing computing device 115 to act as a proxy for each registered passive device (step 325). At step 330, computing device 115 may act as a proxy by operating as an active device, as described in connection with FIG. 2, and implement some or all of the steps illustrated in FIG. 2 (for some or all registered passive devices).

As with the channel protocol for active devices, the user may select the feed paths to be added to the provisioning path for the registered passive devices (step 320). When the passive device is then connected to computing device 115, content described in the feed paths may be downloaded to the passive device via the computing device 115 (step 335). Computing device 115 may then update the synchronization information at step 340 with the list of feeds or the content files that should be synchronized to the passive device(s) 120. Some or all of the steps in FIG. 3 may be periodically repeated to provide a regular stream of content to the individual passive devices.

In some embodiments, passive devices 120 may communicate with computing device 115 before the computing device implements the channel protocol of FIG. 2 for that passive device. Moreover, computing device 115 itself need not be registered with the content provider and may act merely as a conduit to the passive device, which may contain the necessary provisioning and feed paths.

In some embodiments, the provisioning path may be stored on the passive device. Passive device 120 may communicate the provisioning path to computing device 115. Computing device 115 may then implement the channel protocol of FIG. 2 for that passive device.

Turning now to FIG. 4a, one specific implementation of device registration interface 400 constructed in accordance with an embodiment of the invention is shown. Registration application interface 400 may be generated by the content management application that allows users to register playback devices. As shown, interface 400 may be displayed on computing device 115 or on active embodiments of mobile device(s) 120 and may include a pull down list 405, allowing the user to choose the type of device he or she is registering. The user may enter his or her username in field 410 and password in field 415. The user may also enter a personalized name to the device in field 420 in order to more quickly identify it and/or differentiate it from among a group of similar or identical devices (e.g., Kate's IPOD® rather than a more generic IPOD® 20 GB). Submit and cancel buttons 425 and 430 respectively may be used send or clear entered information. Once the user completes the registration process, which may require the user to enter a password, a channel from that remote computer hosting the content management application is established and a provisioning path is sent as described above.

Figure 4B:
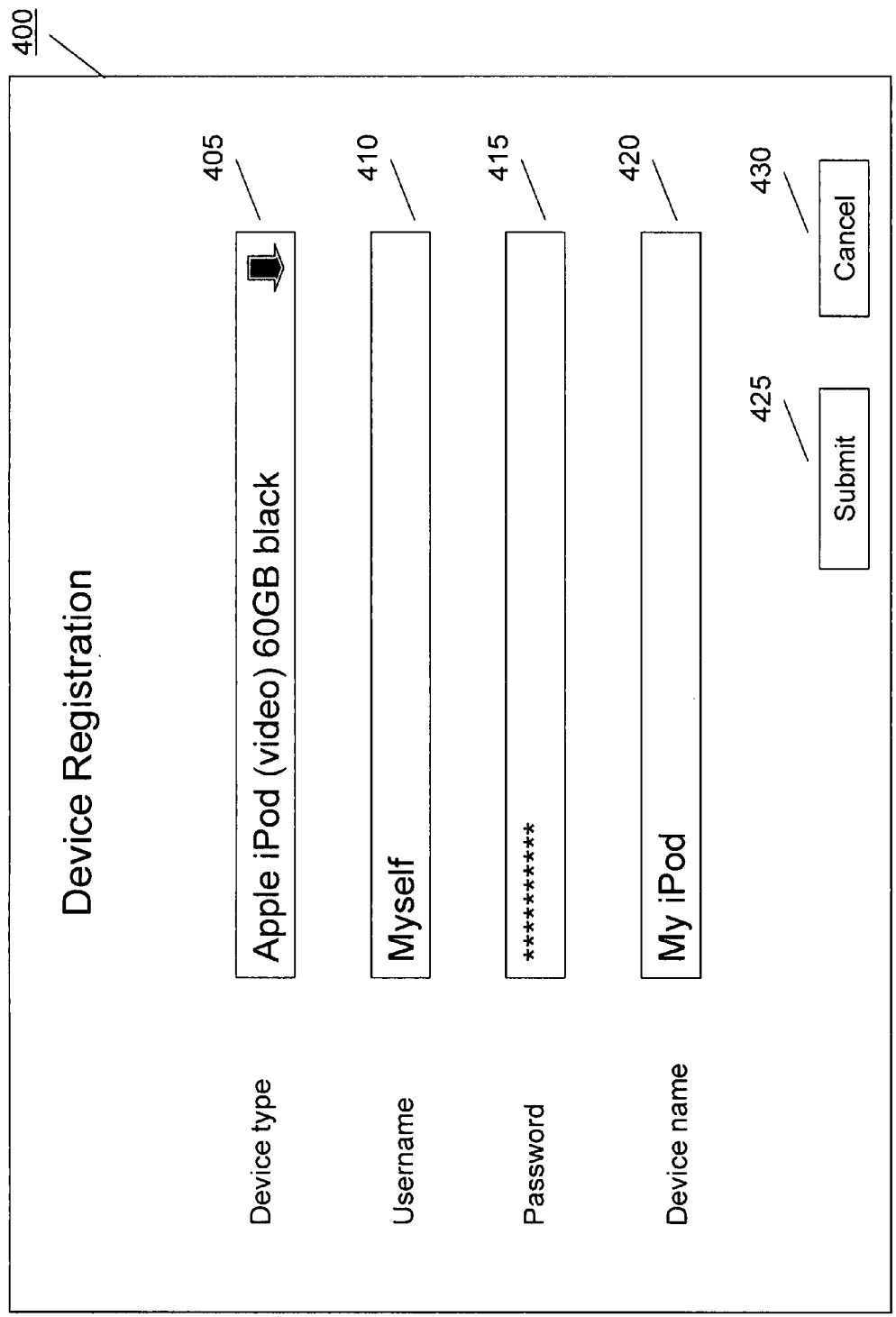

FIG. 4b shows the device registration interface of FIG. 4a as completed by the user, where the user is registering a black IPOD® video 60 GB (field 405), has entered his or her username (field 410) and password (field 415), and has named the device My IPOD® (field 420). The user may click on the submit button 425 to complete the registration. If the user wants to cancel the registration process, he or she may select the cancel button 430. In some embodiments, a user registers a device using a web browser.

As mentioned above, the registration of a device may cause the creation of a channel by the content management application as described in connection with flowchart 200, step 210. The user may then assign one or more content feeds the channel, as described in connection with flowchart 200 or 300.

Moreover, the delivery of feed paths contained in the provisioning paths may be managed through a central location, such as a web-based control panel which is part of the content management application described herein. The control panel may be accessed from a registered computing device, a non-registered computing device, a registered active device or a non-registered active device. This provides the user with a great deal of flexibility in defining both feed and provisioning paths for registered devices. Moreover, such a control panel may allow a user, content provider, the content management application or other authorized party to determine where feeds and their associated content will be delivered, without requiring each playback device to be configured individually.

Various possible specific implementations of the control panel of the content management application described above are illustrated in FIGS. 5a through 5e. As shown, a user, content provider or other authorized party can access the control panel and manage the association of content feeds among the channels using a web browser, such as MICROSOFT INTERNET EXPLORER®. For example, in the embodiment shown in FIG. 5a, the content management application may provide a pre-determined list of content feeds, which may include, for example, a technology feed 500, a news feed 501, a comedy feed 502, a sports feed 503, a romance feed 504, a fiction feed 505, a mystery feed 506 and a self-development feed 507. Of course, any set of feeds may be provided. A user, content provider or other authorized third party may select the content feeds by checking or un-checking the boxes associated with each feed. For example, if it is desired to receive the news content, the news content box will be checked, etc.

Figure 5B:
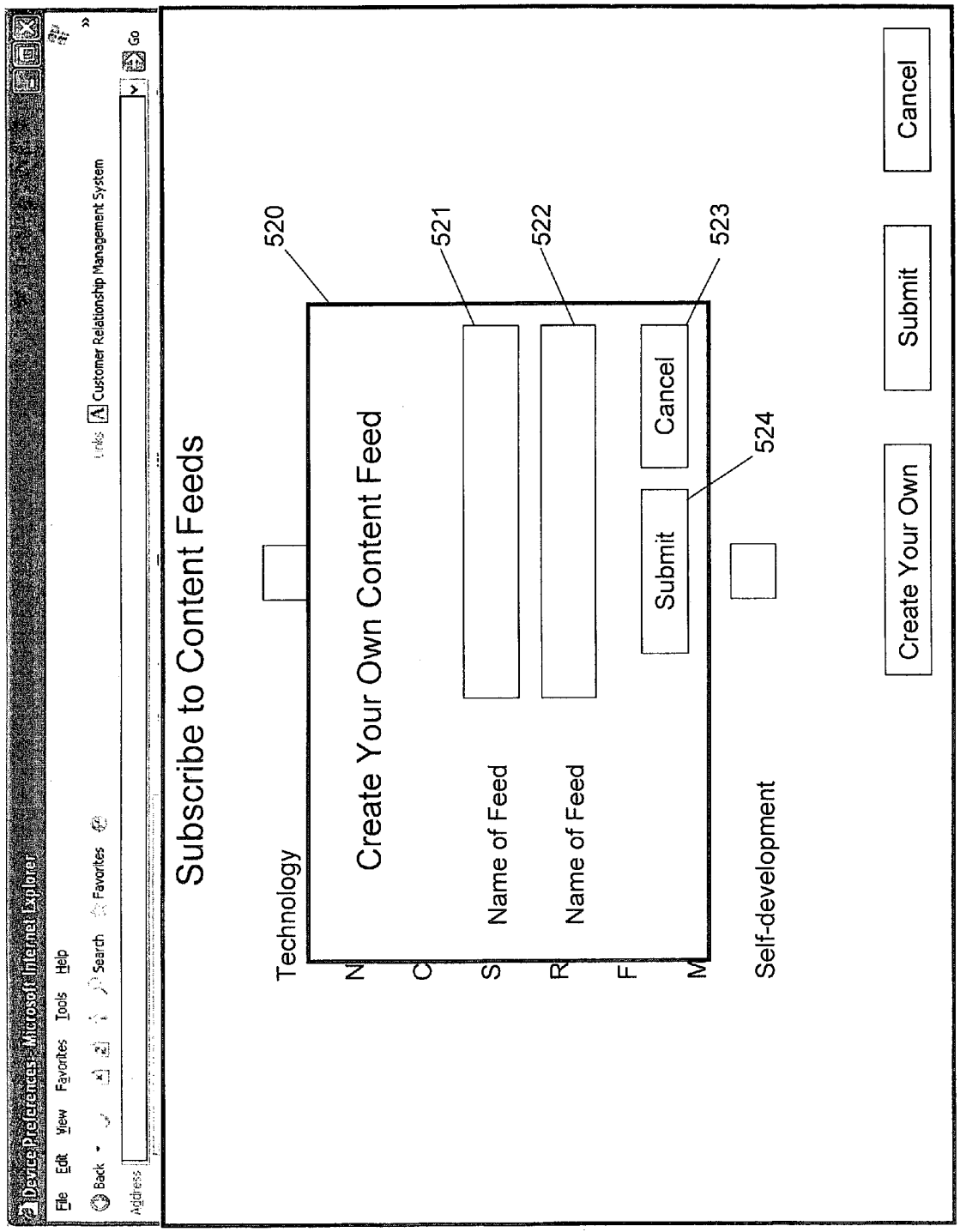
FIG. 5b depicts certain additional features of the content management program of the present invention.
Figure 5C:
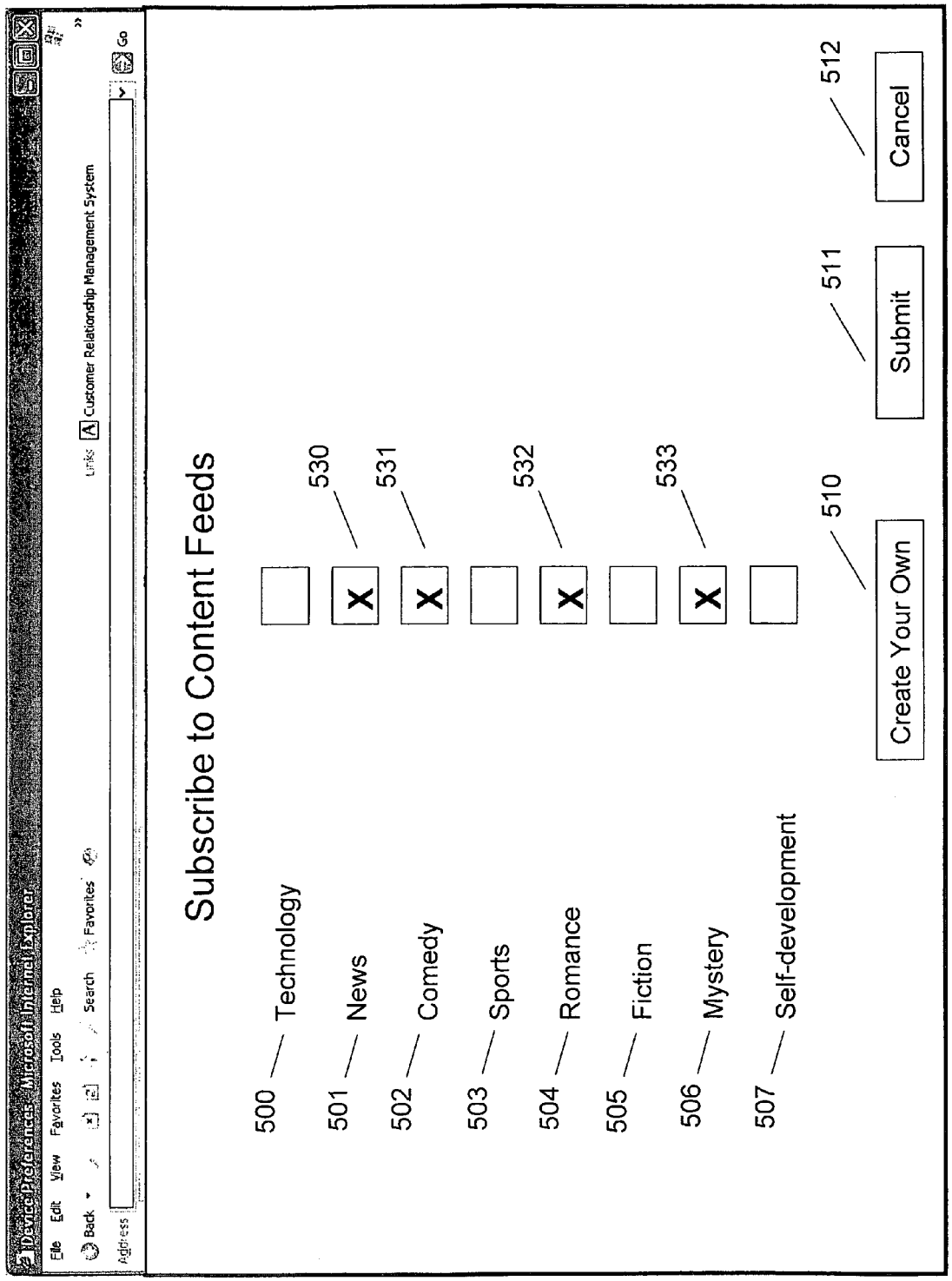
FIG. 5c depicts certain additional features of the content management program of the present invention.

The content management application may also allow the user to create a customized content feed using the Create Your Own button 510, shown in FIGS. 5a-5c. By clicking on the Create Your Own button 510, a pop-up window 520 is displayed, as depicted in FIG. 5b. In the pop-up window 520, a user may name one or more customized feeds by filling in fields 521 and 522 and then clicking on the Submit button 524. Such feeds may be obtained by searching the Internet or other networks using a browsing and search application or may be imported bookmarks or another pre-existing feed location that may be associated the name given by the user in feed fields 521 and 522.

Figure 5D:
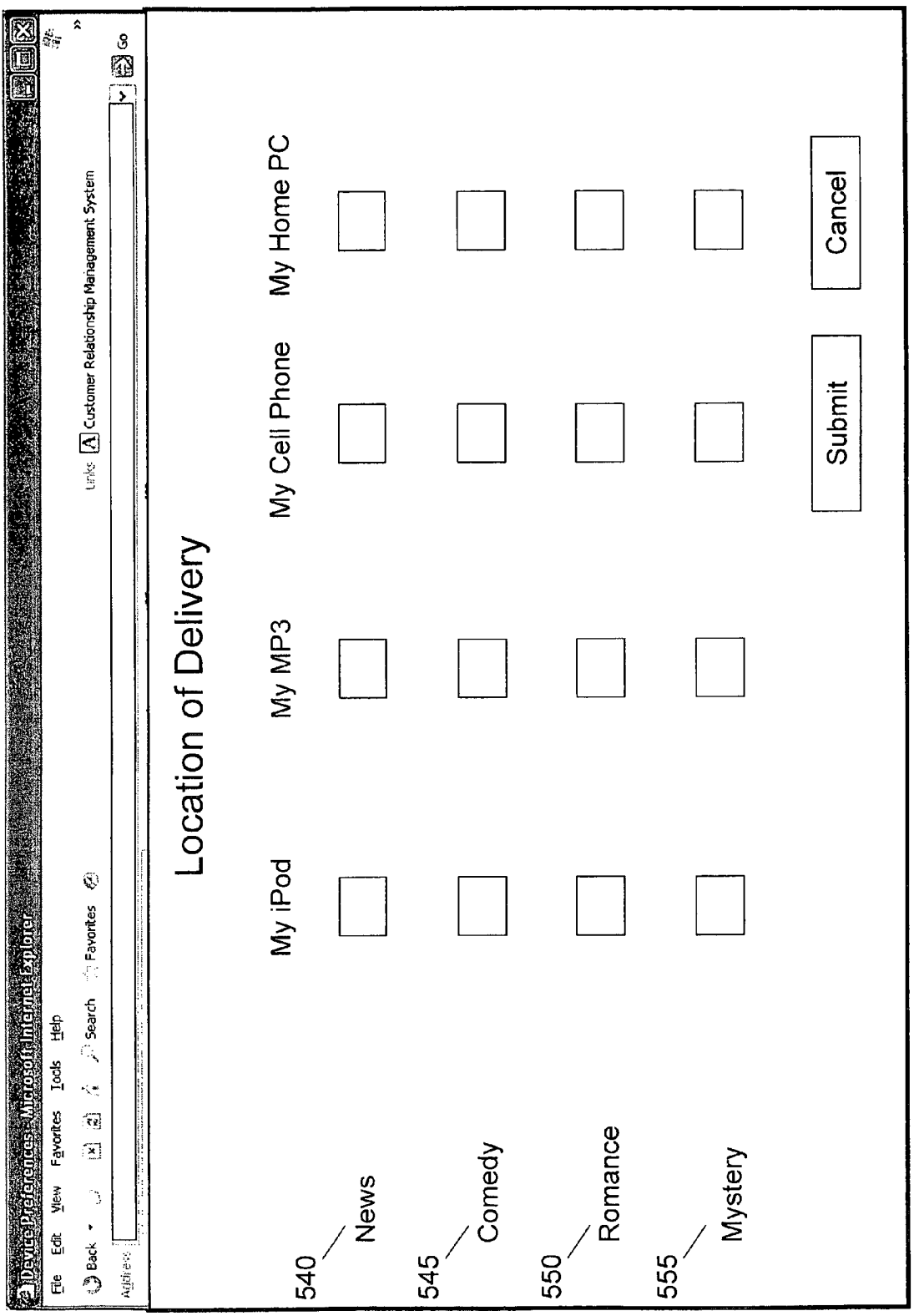
FIG. 5d depicts certain additional features of the content management program of the present invention.

As shown in FIG. 5c, the user may check boxes corresponding to the feeds to which he or she wishes to subscribe, including the news feed (box 530), comedy feed (box 531), romance feed (box 532) and mystery feed (box 533). After the user has subscribed to the feeds of his or her choice, the delivery location for each feed may be specified. For example, FIG. 5d shows the delivery location control panel for a user with four registered devices—an iPod, a MP3 player, a cell phone and a home personal computer. Others may be added as desired.

Figure 5E:
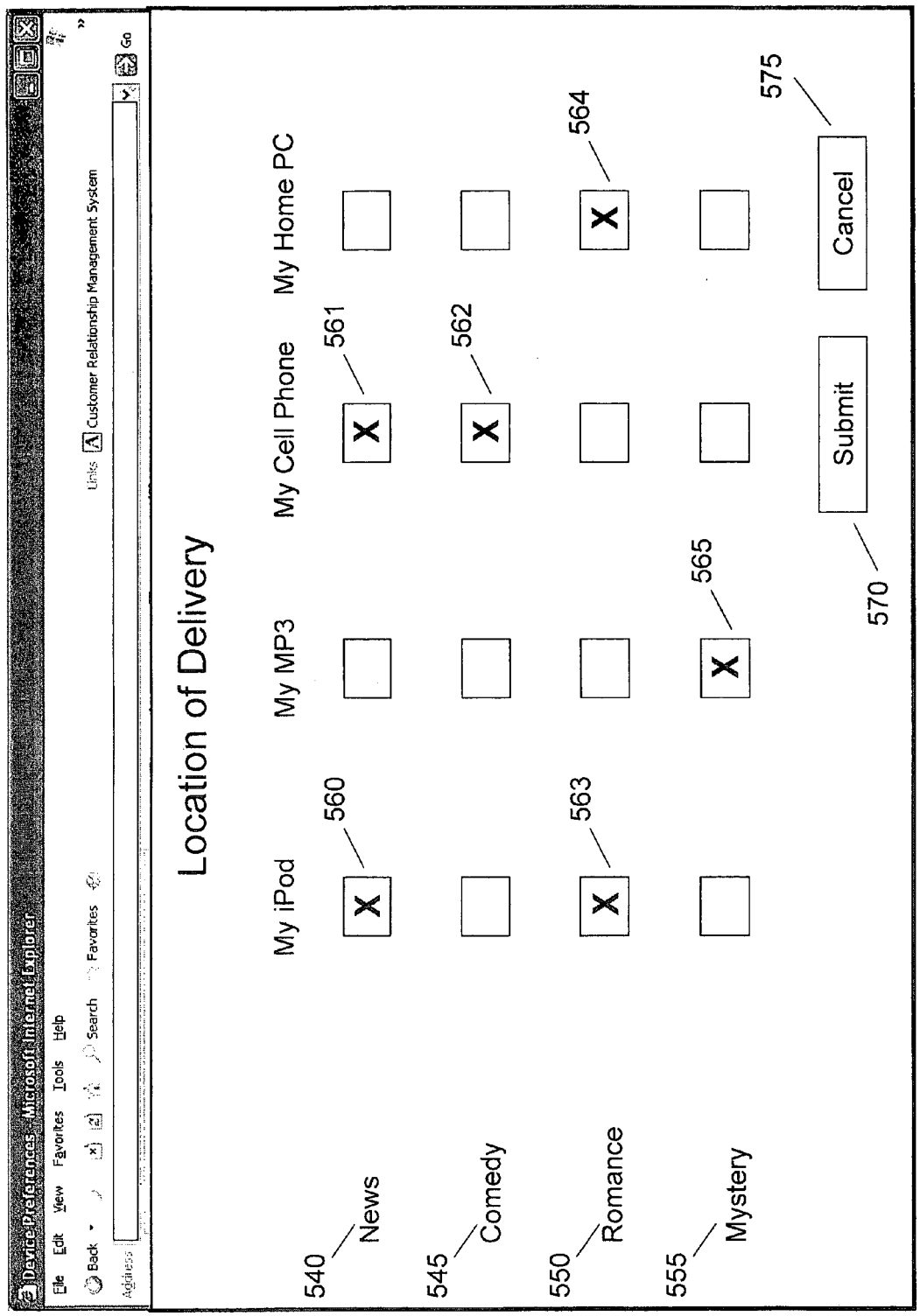
FIG. 5e depicts certain additional features of the content management program of the present invention.

As shown in FIG. 5e, the user can select the destination of each content feed to one or more registered devices. As illustrated by the checked boxes, the user has chosen to have the news feed delivered to the iPod (box 560) and cell phone (box 561), the comedy feed to the cell phone (box 562), the romance feed to the iPod (box 563) and home personal computer (box 564), and the mystery feed to the MP3 player (box 565). Unchecked boxes indicate that the listed content will not be sent to the associated playback devices. Once the user selects the desired destination of each content feed, the user may select the Submit button 570, which transmits these preferences the content management application. These preferences will populate/update the provisioning list as described above. Subsequently, the playback devices will consult this updated provisioning list through the provisioning channels and update their local provisioning lists to reflect the user's input.

In some embodiments, the content management application may restrict the number of registered devices that may receive a particular feed. Moreover, it will be understood that multiple interfaces in FIGS. 5a-5e may be present in any specific implementation and that the inventions described herein are not limited to an individual implementation. For example, each family member, corporation or other group member may have a dedicated set of control panels to manage their content. Moreover, each user's playback device may have multiple channels associated with it such that its content is based on feed paths from multiple provisioning locations.

Furthermore, in some embodiments, the registration process and the selection of delivery locations may occur together. In such an embodiment, the user may register a device and determine which feeds are delivered to that device in one step.

Figure 6:
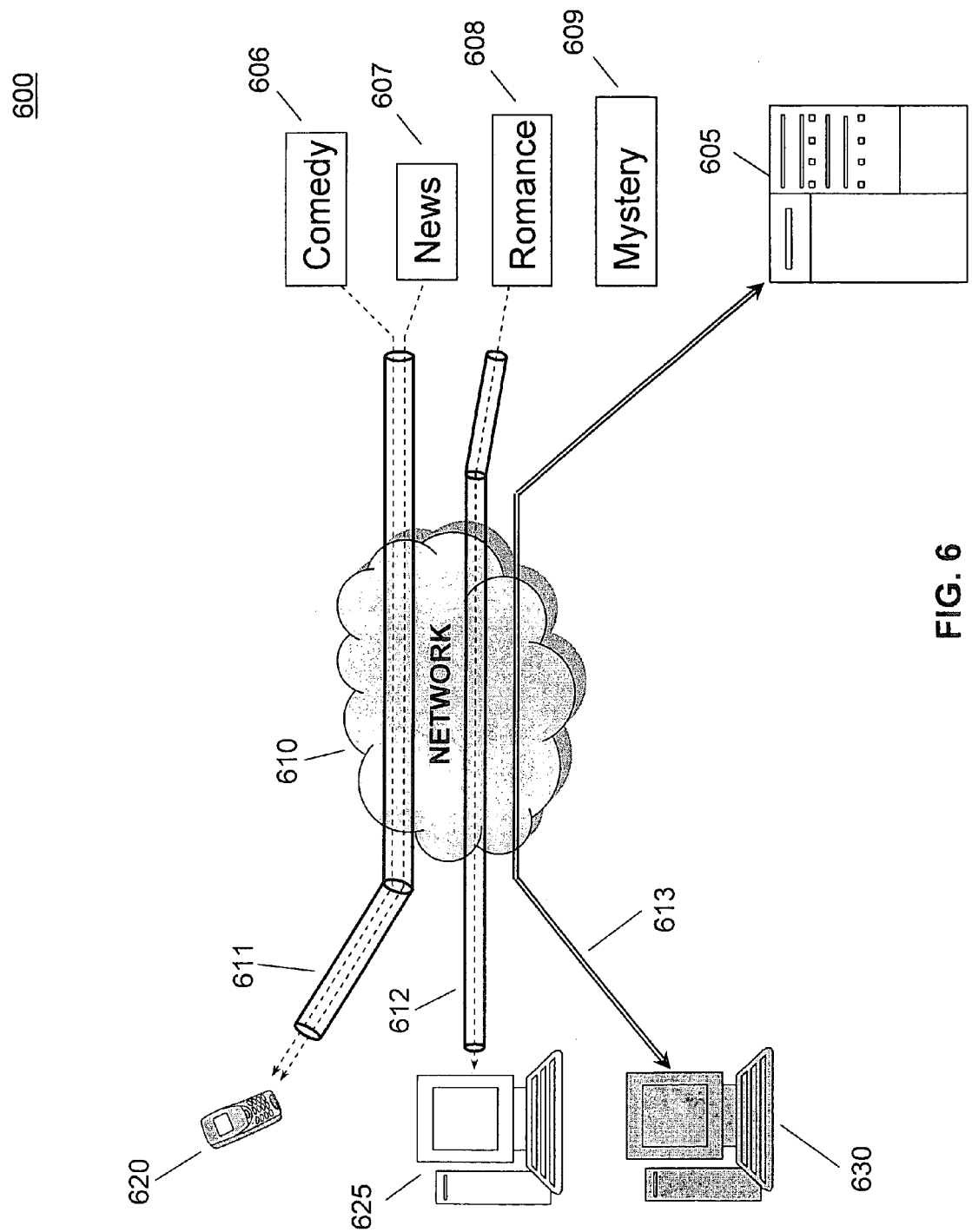
FIG. 6 is a diagram of a computer network illustrating certain content routing in accordance with an embodiment of the present invention.

Turning now to FIG. 6, a general diagram of a network 600 constructed in accordance with the principles of the present invention is illustrated. Registered active devices 620 (wireless telephone) and 625 (computer) may communicate with various content feeds 606-609 as specified in each playback devices' provisioning list. Although the active devices in the example shown in FIG. 6 are a wireless telephone and a computer, it will be understood that any suitable active device may be used in the network 600. Remote computing device 605, which may be substantially similar to server 105 in FIG. 1, is connected to the network via existing network connection 613. Remote computing device 605 may store the provisioning list for devices 620 and 625. The user may determine the feeds to be delivered via channels 611-612 through a web-based control panel or other suitable interface as described herein (e.g., in connection with FIGS. 2-5). The control panel for devices 620 and 625 may be accessed through a web browser using computing device 630 and existing network connection 613. Computing device 630 may be a registered device. In this example, the user has comedy feed 606 and news feed 607 delivered via channel 611 to the user's cell phone 620 and a romance feed 608 delivered via channel 612 to the user's home personal computer 625.

Figure 7:
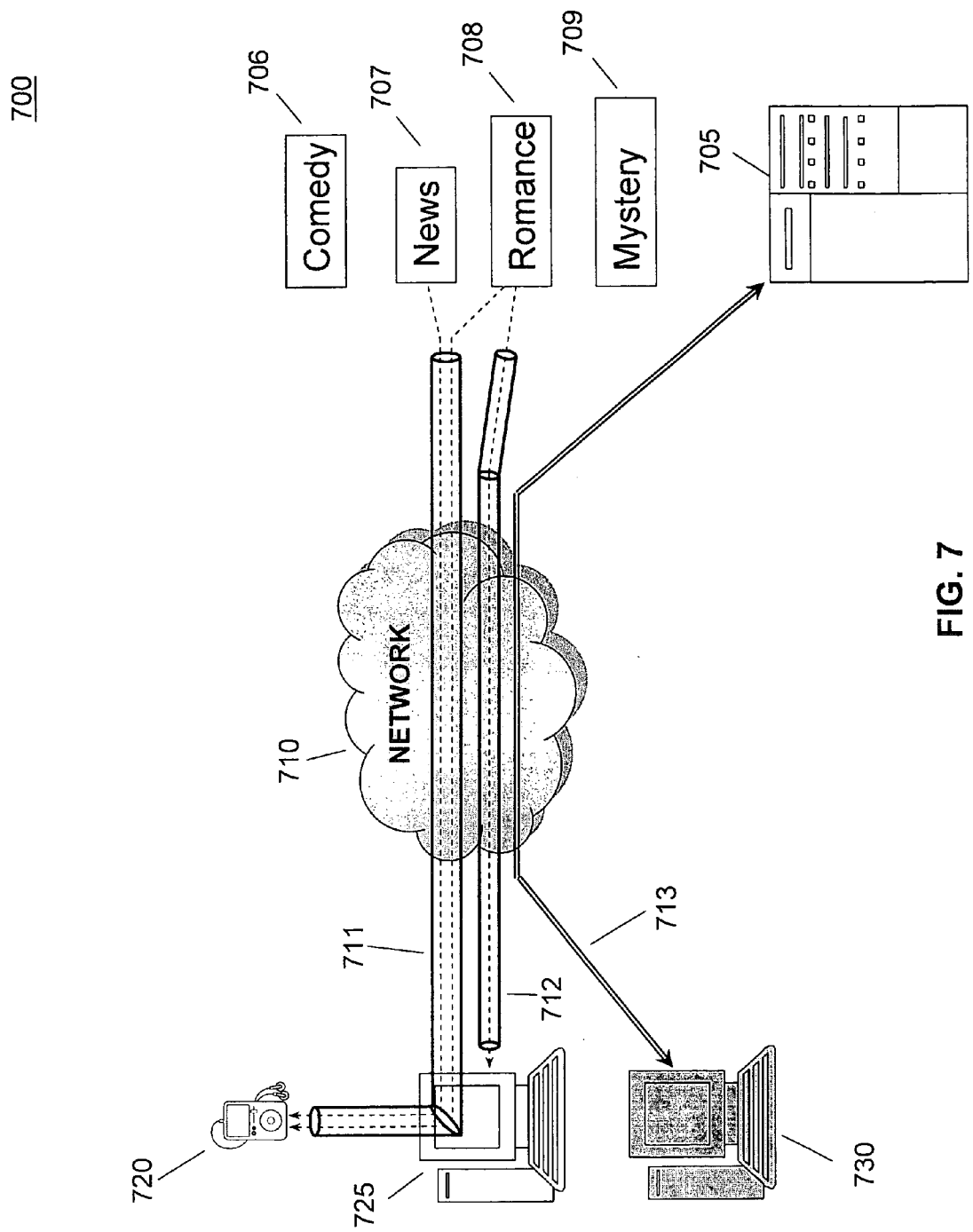
FIG. 7 is a diagram of a computer network illustrating certain content routing in accordance with an embodiment of the present invention.

An additional illustrative embodiment in accordance with the present invention is depicted in network 700 of FIG. 7. The system 700 uses a passive device 720 which receives content through computing device 725, such as a PC, via channel 711, which may be set up as described herein in connection with the flowchart of FIG. 3. Remote computing device 705, which may be substantially similar to server 105 in FIG. 1, is connected to the network via existing network connection 713. Remote computing device 705 may store the content delivered to the devices 720 and 725 via channels 711 and 712 respectively. The control panels for devices 720 and 725 may be accessed through a web browser using computing device 730 and existing network connection 713. Upon communication with passive device 720, computing device 725 distributes the requested content via channel 711 to passive device 720 based upon the user's preferences.

In FIG. 7, the user's IPOD® 720 may receive a news feed 707 and a romance feed 708 to be delivered via channel 711. Upon the request of computer 725 to retrieve the feed list for channel 711, the remote computer hosting the content management program may return the feed list to computer 725. When the IPOD® 720 is connected to computer 725, computer 725 may distribute the content via channel 711 to IPOD® 720 pursuant to the content feed list for channel 711. Computer 725 may also be updated with synchronization information, including the list of feeds and/or content files which are synchronized to each passive device. Computer 725 may be a registered active device, and receive a romance feed 708 designated for it via channel 712, as described in connection with FIG. 2. Thus, computer 725 receives content from both channel 711 and 712. However, channel 711 is primarily intended for passive device 720, and computer 725 acts as a proxy, receiving content from channel 711 directly and passing it to passive device 720.

Figure 8:
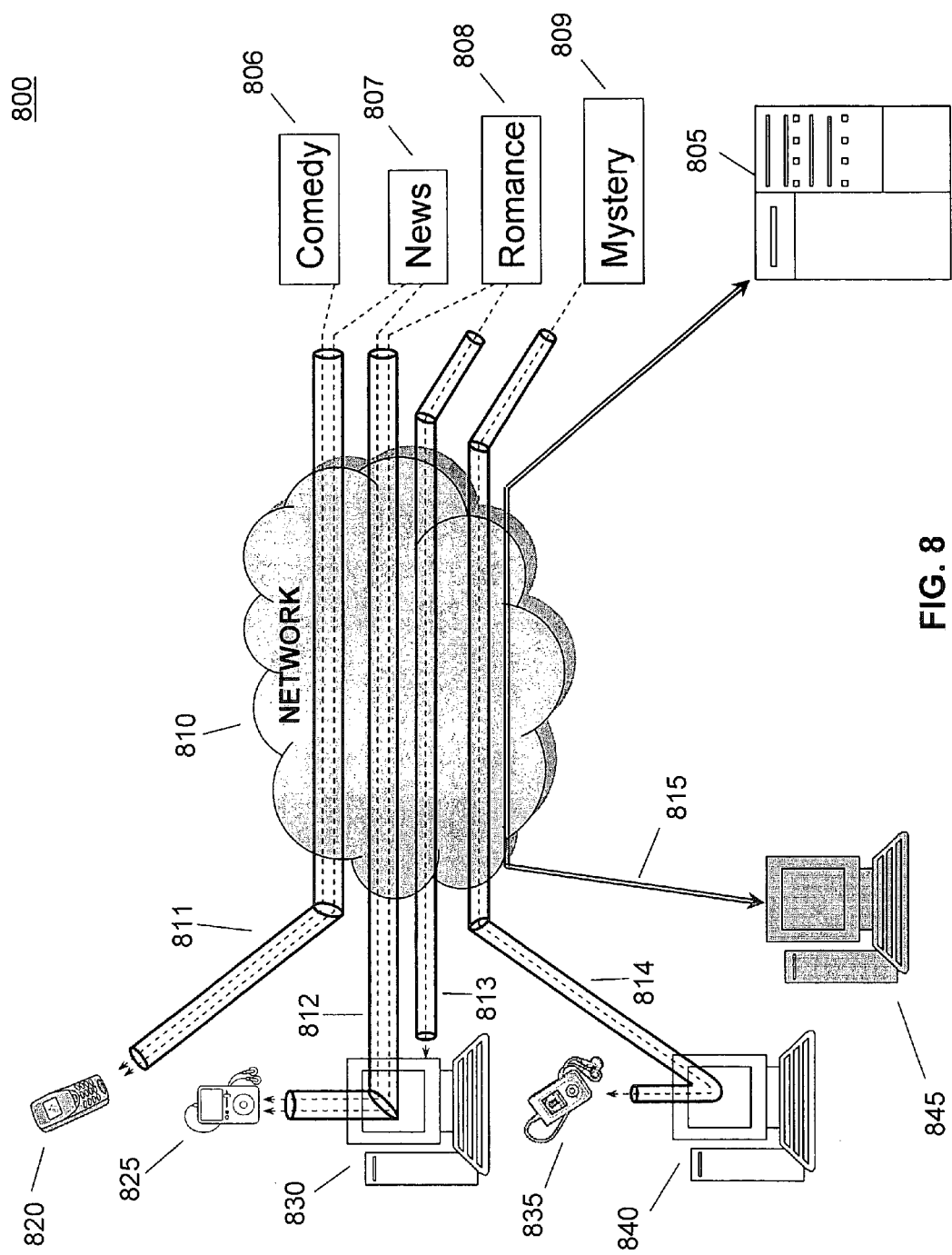
FIG. 8 is a diagram of a computer network illustrating certain content routing in accordance with an embodiment of the present invention.

FIG. 8 depicts a system 800 in accordance with an embodiment of the present invention. System 800 includes active device 820, passive device 825, active computing device 830, passive device 835, and active computing device 840. Active computing device 840 may be registered. Remote computing device 805, which may be substantially similar to server 105 in FIG. 1, is connected to the network via existing network connection 813. Registered active device 820 and registered active computing device 830 may communicate with the remote computer hosting the content management program substantially directly, acting as recipients for the downloaded feeds, as described in connection with FIG. 2. Registered passive devices 825 and 835 may communicate with the various content feeds through computing devices 830 and 840, respectively, as described in connection with FIG. 3.

The user may determine the content to be delivered via channels 811-814 through the use of a web-based control panel or other suitable interface, such as those described herein in connection with FIGS. 4-5, which may be accessed initially using computing device 845 and pre-existing network connection 815. Such channels may be pre-existing from previously created channels or may be created to specially convey the associated content. For example, if a user receives comedy feed 806, it may be delivered via channel 811, news feed 807 is delivered via channels 811 and 812, and romance feed 808 delivered via channels 812 and 813. In this example, based on the user's selection, channel 811 may transmit the comedy and news feeds to the user's cell phone 820, channel 812 may transmit the news and romance feeds to the user's IPOD® 825, channel 813 may transmit the romance feed to personal computer 830, and channel 814 may transmit mystery feed 809 to the user's MP3 player 835 through computer 840. Computers 830 and 840 may also be updated with synchronization information, which may include a list of feeds and/or content files that are synchronized to each passive device connected to it, etc.

While the invention has been described and illustrated in connection with preferred embodiments, many variations and modifications will be evident to those skilled in the art and may be made without departing from the spirit and scope of the invention. The invention is thus not to be limited to the precise details of methodology or construction set forth above as such variations and modification are intended to be included within the scope of the invention.

What is claimed is:

1. A computer-implemented method of delivering electronic content from a remote computer to a plurality of playback devices, the method comprising:
   receiving at least one registration request for the plurality of playback devices;
   in response to the at least one registration request, registering the plurality of playback devices;
   providing a centralized content management interface that presents to a user a plurality of content feeds available to the user, wherein the centralized content management interface enables the user to associate at least one of the available content feeds with each of the plurality of playback devices;
   communicating a provisioning network location to each of the plurality of playback devices, wherein the provisioning network location communicated to a given playback device of the plurality of playback devices includes a provisioning list specifying two or more content feeds associated with the given playback device, wherein a first provisioning network location communicated to a first playback device of the plurality of playback devices is different than a second provisioning network location communicated to a second playback device of the plurality of playback devices, wherein a provisioning list associated with the second playback device is managed by a proxy computing device, wherein the provisioning network location communicated to each of the plurality of playback devices comprises at least one of a Uniform Resource Locator, a network address or a path;
   receiving a request from at least one of the plurality of playback devices for content associated with the provisioning network location which was communicated to the given playback device;
   in response to the request for content associated with said provisioning network location, transmitting at least one of the two or more content feeds associated with the given playback device to the given playback device; and
   periodically transmitting content to the proxy computing device from at least one content feed for transfer from the proxy computing device to the second playback device.

2. The computer-implemented method of claim 1 further comprising periodically receiving content with the plurality of playback devices from the at least one of the two or more content feeds.

3. The computer-implemented method of claim 1 wherein the provisioning network location comprises a provisioning URL.

4. The computer-implemented method of claim 3 wherein the at least one of the two or more content feeds is providing a feed URL.

5. The computer-implemented method of claim 1 wherein the content management interface allows the user to designate a plurality of content feeds for each of the plurality of registered playback devices.

6. The computer-implemented method of claim 5 wherein the content management interface substantially automatically organizes the plurality of content feeds into categories.

7. The computer-implemented method of claim 1 wherein the content management interface is located on a remote computer.

8. The computer-implemented method of claim 1 wherein the provisioning list is initially substantially automatically populated based on a default setting.

9. The computer-implemented method of claim 1 wherein the provisioning list is initially populated based on user input to the content management interface.

10. The computer-implemented method of claim 1 wherein the provisioning list is periodically modified by the user using the content management interface.

11. The computer-implemented method of claim 10 wherein the provisioning list is periodically modified by selecting content feeds to add from a plurality of predefined content feeds.

12. The computer-implemented method of claim 10 wherein the provisioning list is periodically modified by selecting content feeds to be removed from a plurality of predefined content feeds previously associated with at least one of the plurality of playback devices.

13. The computer-implemented method of claim 10 wherein the provisioning list is periodically modified by the user by searching for and selecting customized content feeds.

14. The computer-implemented method of claim 1 wherein the provisioning list is provided substantially directly to at least one of the plurality of playback devices.

15. The computer-implemented method of claim 1 wherein the content management interface allows the user to specify a different provisioning network location for each of the plurality of playback devices.

16. A system for delivering one or more electronic content feeds from a remote computer to a plurality of playback devices, the system comprising:
   a remote computing device that is configured to:
      provide a centralized content management interface that presents to a user a plurality of content feeds available to the user, wherein the centralized content management interface enables the user to associate at least one of the available content feeds with each of the plurality of playback devices;
      communicate a provisioning network location to each of the plurality of playback devices, wherein the provisioning network location communicated to a given playback device of the plurality of playback devices includes a provisioning list specifying two or more content feeds associated with the given playback device, wherein a first provisioning network location communicated to a first playback device of the plurality of playback devices is different than a second provisioning network location communicated to a second playback device of the plurality of playback devices, wherein a provisioning list associated with the second playback device is managed by a proxy computing device, wherein the provisioning network location communicated to each of the plurality of playback devices comprises at least one of a Uniform Resource Locator, a network address or a path;
      receive a request from at least one of the plurality of playback devices for content associated with the provisioning network location which was communicated to the given playback device;
      based at least in part on the request for content associated with said provisioning network location, transmit at least one of the two or more content feeds associated with the given playback device to the given playback device; and periodically transmit content to the proxy computing device from at least one content feed for transfer from the proxy computing device to the second playback device.

17. The system of claim 16 wherein the plurality of playback devices are configured to periodically receive content from the at least one of the two or more content feeds associated with each of the plurality of playback devices.

18. The system of claim 16 wherein the content management interface is configured to allow the user to periodically modify the provisioning list by searching for and selecting customized content feeds.

19. The system of claim 16 wherein the content management interface is configured by the user to designate a plurality of content feeds for each of the plurality of registered playback devices.

20. The system of claim 16 wherein the content management interface is configured to allow the user to specify a different provisioning network location for each of the plurality of playback devices.

* * * * *